(No Model.)
P. KERN.
CIGAR CUTTER AND SUPPORT.
No. 401,174. Patented Apr. 9, 1889.
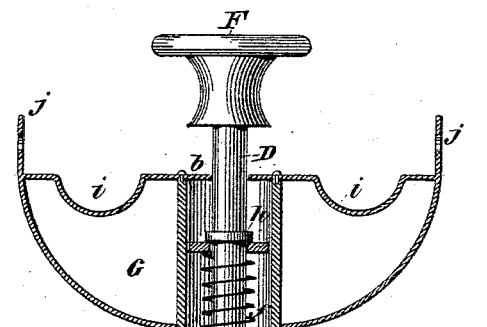
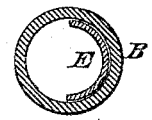
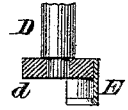
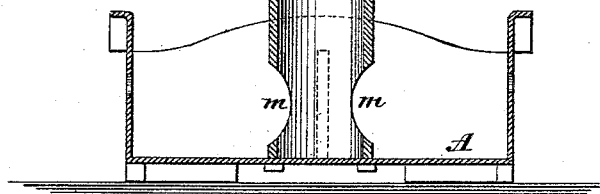
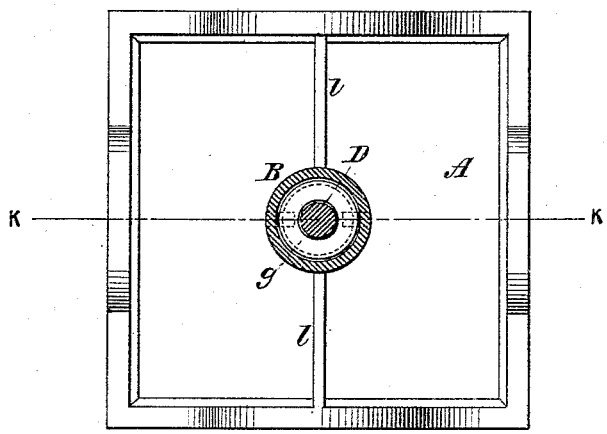
WITNESSES:
Gustave Dieterich
T. F. Bourne.
INVENTOR
Phillip Kern.
BY
Briesen & Steele
ATTORNEYS.
N. PETERS, Photo-Lithographer, Washington, D. C.

UNITED STATES PATENT OFFICE.

PHILLIP KERN, OF YONKERS, NEW YORK.

CIGAR CUTTER AND SUPPORT.

SPECIFICATION forming part of Letters Patent No. 401,174, dated April 9, 1889.

Application filed June 1, 1888. Serial No. 275,714. (No model.)

*To all whom it may concern:*

Be it known that I, PHILLIP KERN, of Yonkers, Westchester county, New York, have invented an Improved Cigar Cutter and Support, of which the following is a specification.

The object of my invention is to provide a simple and convenient cigar cutter and support.

The invention consists in the details of improvement and the combinations of parts, that will be more fully hereinafter set forth.

Reference is to be had to the accompanying drawings, forming part of this specification, in which—

Figure 1 is a vertical cross-section of my improved device on the plane of the line $k\,k$, Fig. 2. Fig. 2 is a horizontal section on the line $c\,c$, Fig. 1. Fig. 3 is a detail cross-section on the line $c'\,c'$, Fig. 1. Fig. 4 is a detail sectional view of the cutter and pusher and their supporting-rod, and Fig. 5 is a detail view showing a cigar as cut by my device.

In the accompanying drawings, the letter A represents a box or receptacle of suitable construction.

B is a vertical hollow column or cylindrical tube rising from the box A. At its lower part the tube B is provided with suitable openings, $m$, for the passage of cigar-ends from said tube into said receptacle A. On the side of the tube B is an opening, $a$, into which the tip or point of a cigar may be passed when it is desired to cut off the same.

D is a rod or plunger that passes within the tube B and projects beyond its upper end. Said rod D may, if desired, be guided at its upper end in a plate, $b$, on the top of the tube B. At its lower or inner end the rod D carries a suitable head or pusher, $d$, that is adapted to slide within the tube B. This head $d$, or, if preferred, the rod D, carries a cutter, E, that is concave or takes the shape of the inner wall of the tube B. (See Figs. 3 and 4.) This concave cutter E is adapted to be pushed along in the tube and over the opening $a$ therein, and thereby to cut off the tip or point of a cigar when passed into said opening. The head $d$ is adapted to push the cut-off end of the cigar down through the tube B. The cutter E makes a concave cut in the end of the cigar, as shown in Fig. 5. By making a concave cut in the end of the cigar the smoke can freely pass through the end of the cigar, and said end of the cigar will not be so readily injured by the smoker as where a V-shaped cut is made, as heretofore. A concave cut is also preferable to a straight cut, as passing farther into the body of the cigar and permitting freer passage of the smoke.

One or more pins, $e$, project within the tube B, and limit the upward movement of the rod D by coming in the path of the head $d$; but, if preferred, a pin may pass through a slot in the rod D. $f$ is a spring that surrounds the rod D, and presses at one end against a loose washer, $g$, on said rod D, which washer rests against the pin $e$. The other end of the spring $f$ presses against a collar, $h$, on the rod D, or against a washer interposed between the spring and said collar. This spring $f$ tends to raise the rod D, and thereby the cutter E, holding the latter above the opening $a$. On the upper end of the rod D is a knob, F, to be engaged by the hand.

At the upper part of the tube B is a head, G, of suitable construction, that is provided with recesses $i$, in which a cigar may be laid and supported. This head G forms the top plate, $b$, of the tube B, as shown. $j$ are apertured lugs on said head, that are adapted to receive a screw when the cutter and support is to be hung up on the wall or elsewhere. The side of the receptacle A under said lugs may also have an aperture to receive a screw to assist in supporting the device.

$l$ are partitions within the receptacle A, which extend preferably from the tube B to the inner walls of said receptacle. These partitions form compartments in the receptacle A, in one of which matches may be kept, if desired, and in the other cigar-ashes may be placed.

On the outer side of the receptacle A may be placed one or more pieces of sand-paper or other rough surface upon which matches can be ignited.

This cigar cutter and support will be found simple and convenient and is not liable to get out of order.

Having now described my invention, what I claim is—

1. The single tube B, having opening $m$ at its lower end, a cutter within said tube, rod D, carrying said cutter, and knob F on said rod, combined with the head G, carried at the upper end of said tube and having cigar-recesses $i$, the head G serving to limit the movement of the knob F, substantially as described.

2. The receptacle A, having apertured wall, tube B, and concave cutter E within said tube, rod D, carrying the cutter E, and knob F on said rod, combined with the cigar-rest G on the tube B, and the apertured lug $j$ on said head, said lug being above the aperture in the wall of the receptacle A, the head G serving to limit the movement of the knob F, substantially as described.

PHILLIP KERN.

Witnesses:
HARRY HOLT,
HARRY M. TURK.